Dec. 27, 1955     W. F. GOODYEAR     2,728,863
RADIATION METER
Filed April 3, 1953
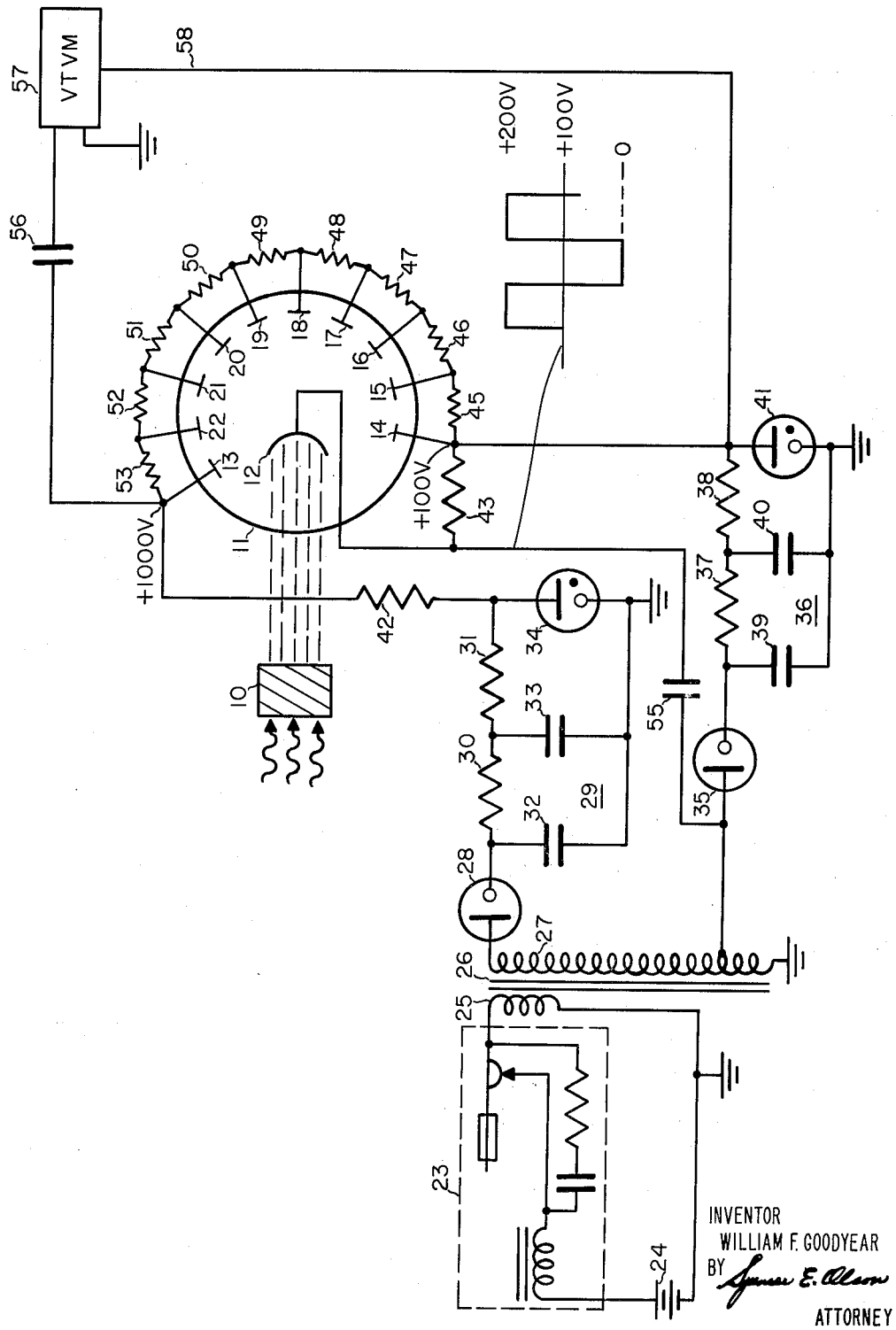
INVENTOR
WILLIAM F. GOODYEAR
BY
ATTORNEY United States Patent Office 2,728,863
Patented Dec. 27, 1955

2,728,863

RADIATION METER

William F. Goodyear, Natick, Mass., assignor to Tracerlab, Inc., Boston, Mass., a corporation of Massachusetts Application April 3, 1953, Serial No. 346,743

5 Claims. (Cl. 250—207)

This invention relates to light measuring devices and more particularly to a circuit for improving the operating range of a photomultiplier tube when used as a detector of a continuous light source.

Photomultiplier tubes, in which electrons are emitted from a photocathode upon the incidence of light thereon, produce a small current flow, which after amplification in the tube itself, is amplified by a direct current amplifier to a suitable magnitude to operate an indicator for measuring the intensity of the incident light. Such photomultipliers have been used in combination with scintillation crystals, such as thallium activated sodium iodide, which under the influence of radioactivity, such as gamma rays, produce pulses of light, which upon impingement on the photocathode of the photomultiplier, produce a minute current which is proportional to the incident gamma rays. This combination of elements provides a particularly useful survey instrument for the detection and measurement of radiation in contaminated areas, but the range of intensities encountered in this application extends over a wide range thereby imposing rather serious requirements on the characteristics of the tube. For example, it is desirable to be able to measure radiation intensities over a range which varies by a factor of 1000 from the low to the high end of the range, which, since the light output of the crystal is substantially linear with changes in incident radiation, requires that the photomultiplier reliably produce currents varying in magnitude over three decades, and this at a fixed potential applied across the photomultiplier tube. It has been observed that, when sustained currents of the order of $5 \times 10^{-6}$ ampere or more are produced by the photomultiplier, the tube "fatigues" seriously, and the output current "falls off" and becomes very erratic. It is necessary, therefore, to operate the photomultiplier at relatively low voltages, and consequently low signal currents, to realize reproducible results. This selection of operating voltage introduces two further problems; first, the signal currents at the lower end of the range are extremely small, being of the order of magnitude of the "dark" current of the photomultiplier comprised of the sum of the leakages across the elements of the tube and of the random emission from the photocathode in the absence of light, and second, the signal-to-noise ratio of the tube is low at reduced operating voltages since the gain has been lowered exponentially and the leakage currents linearly with the reduced voltage. In view of the foregoing limitations of present photomultipliers and the manner in which they are necessarily operated in scintillation survey instruments, it is necessary to reduce the "dark" current and thereby improve the signal-to-noise ratio to enable the detection and reliable measurement of extremely weak sources of light.

One prior art method having the effect of improving the signal-to-noise ratio of the photomultiplier consists of interrupting the light signal incident on the photocathode of the tube by a mechanical arrangement such as a whirling disc with one or more holes in it through which the light passes to the photocathode. The signal output is then converted to an alternating signal, and may be separated from the "dark" current which is not modulated, and measured independently. Such whirling disc or other "chopping" arrangements are quite effective, but obviously there are many applications where such mechanical structure cannot be used, in a portable radiation measuring instrument, for example.

It is an object of the present invention to improve the operating range of a photomultiplier tube when used as a detector of a continuous light source.

A further object of the invention is to provide an auxiliary circuit for a photomultiplier tube whereby the output signal is independent of the leakage currents in the photomultiplier.

A further object of the invention is to improve the effective signal-to-noise ratio of a photomultiplier tube, particularly in the region of small signal currents, by eliminating the effect of leakage currents in the output signal.

A corollary object of the invention is to provide such an arrangement in a portable instrument without the necessity of expensive components beyond those required for the normal operation of the photomultiplier. That is, the arrangement is simple to construct, is rugged in design and entails no mechanical complexities.

With the foregoing in mind, the invention is featured by the combination of a photomultiplier tube of the type having a photocathode, a plurality of dynodes and a collector, and a source of power for the tube by which the potential of the first dynode of the tube is maintained at a fixed potential and the potential of the photocathode with respect to the first dynode is cyclically varied. When the photocathode is positive with respect to the first dynode, no signal current flows, and when the photocathode is negative with respect to the first dynode, signal current flows in the normal fashion. Accordingly, the signal is effectively "chopped" and is separated from the leakage currents which are not so modulated.

Other objects, features and advantages of the invention will become apparent from the following detailed description taken in connection with the accompanying drawing of which the single figure is a circuit diagram illustrating a preferred embodiment of the invention as applied to a scintillation radiation measuring instrument.

Referring to the drawing in detail, a scintillation type crystal 10, such as anthracene, naphthalene, thallium activated sodium iodide or transtilbene is disposed in a position where the presence of radiation is suspected. A multi-electrode photomultiplier 11 is disposed adjacent to crystal 10 in such a manner that light emitted from the crystal falls upon the photocathode 12 of the tube. In the form of the invention illustrated in the drawing, tube 11, in addition to the photocathode 12, has a final electrode or collector 13, and nine intermediate electrodes or dynodes numbered consecutively from 14 to 22. It will be understood, however, that photomultiplier tubes having a greater or lesser number of electrodes may be readily utilized.

To furnish the required potential to the photomultiplier tube 11 there is provided a unidirectional power supply including vibrator 23 connected in series with a small battery 24 and the primary winding 25 of transformer 26. The operation of vibrator 23 is conventional and well known, and need not be described in detail for an understanding of the present invention. Suffice it to say that the vibrator 23 provides an alternating current output of essentially rectangular wave form which is coupled to the secondary winding 27 of transformer 26. High voltage for tube 11 is provided by high voltage rectifier 28, preferably of the cold cathode type, connected as shown, filter 29 comprising resistors 30 and 31 and condensers 32 and 33, and high voltage regulator tube 34. The transformer 26, rectifier 28 and regulator tube 34 are selected to provide a potential of about +1000 volts at the anode of regulator tube 34.

Low voltage is provided for the tube 11, and for auxiliary equipment to be described later, by a second rectifier 35, such as a cold cathode tube or a selenium rectifier, connected to the secondary winding 27 of transformer 26. The rectified output of tube 35 is filtered by filter 36 comprising resistors 37 and 38 and condensers 39 and 40, and applied to the anode of voltage regulator tube 41. Rectifier 35 is connected to winding 27 at such a point that a regulated voltage of +100 volts appears at the anode of regulator tube 41. The anode of regulator tube 34 is connected via resistor 42 to collector electrode 13 of tube 11, and the anode of regulator tube 41 is directly connected to the first dynode 14 and via resistor 43 to photocathode 12. To suitably divide the potential between dynode 14 and collector 13 a plurality of series-connected resistors which may be identical, consecutively numbered from 45 to 53, are connected therebetween. Each of dynodes 15 through 22 are connected to a respective junction between resistors 45 to 53, so that each dynode is successively biased 100 volts positively with respect to the preceding dynode. Thus the first dynode 14 is at a potential of +100 volts (as is photocathode 12), and the potential of successive dynodes increases in 100 volt steps, with the potential on collector 13 being +1000 volts.

With the foregoing potentials applied to the various electrodes of photomultiplier tube 11, it is obvious that the light from crystal 10 would not produce a corresponding amplified electrical signal at collector 13 inasmuch as photocathode 12 and first dynode 14 are at the same potential, with the consequence that emission from photocathode 12 is not attracted to adjacent dynode 14. To render the photomultiplier operative and to achieve the objects of the invention, photocathode 12 is additionally connected via condenser 55 to the anode of rectifier tube 35. Thus, the square wave output from secondary winding 27 is coupled to photocathode 12, the amplitude of the square wave from peak-to-peak preferably being 200 volts for compatibility with the previously described operating potentials. This square wave is superimposed on the +100 volt direct potential provided by regulator tube 41, whereby the photocathode potential is varied with respect to dynode 14 from 100 volts positive to 100 volts negative with respect thereto. When photocathode 12 is positive with respect to dynode 14, no signal current flows because the potential gradient is in the wrong direction to provide attraction of electrons emitted from photocathode 12 toward dynode 14. During the negative half-cycle of the square wave, the photocathode becomes 100 volts negative with respect to dynode 14 and signal current proportional to the intensity of the light from crystal 10 flows in the normal fashion. Accordingly, the signal is "chopped" into increments which can be treated as a composite alternating current signal.

As was mentioned previously, the background current in a photomultiplier consists of two components; namely, the summation of all the various leakage currents which can flow between the electrodes of the tube, across the envelope, etc., and the random emission of electrons from the photocathode and the dynodes in the absence of activating photons. It will be seen that with all of the dynodes maintained at a constant voltage, their combined contribution to the leakage current is not altered by the application of the square wave signal to the photocathode. Of course the photocathode also contributes to the total leakage current, but since the photocathode potential is varied only 100 volts from the normal operating voltage of 1000 volts with respect to the collector, the change, if any, in its contribution to leakage current is proportionately small. In view of the multiplicity of leakage paths from the other elements of the tube, this change in photocathode contribution is second order and consequently the major portion of the leakage is continuous and hence may be separated and discarded from the alternating signal component.

The other component of background current, namely that produced by random emission from the photocathode and dynodes, becomes progressively smaller from succeeding dynodes, and as the collector is approached, the overall electron mutliplication is reduced because progressively fewer stages are utilized in the amplification of the "dark current." Accordingly, the major contribution is from the photocathode and the first few dynodes, with the unfortunate consequence that the photocathode contribution to the "dark" current is also "chopped" and cannot be separated from the signal. The contribution from the dynodes, however, although small, is not chopped and can be separated from the signal along with the leakage currents.

The collector 13 of photomultiplier 11 is connected via condenser 56 to a suitable alternating current voltmeter 57, which is preferably a vacuum tube voltmeter supplied with operating potential via lead 58 from the anode of voltage regulator tube 41. The signal appearing at collector 13 being a composite alternating signal proportional in amplitude to the intensity of the light from crystal 10 having a direct current component equal to the background current described above, the direct current component is blocked by condenser 56 and the alternating signal only is applied to voltmeter 57. Accordingly, meter 57 indicates the magnitude of only the signal current and is not subject to variations in leakage currents which may arise in the photomultiplier. Although tube 11 has only a 50% duty cycle by virtue of the modulation of the photocathode voltage, improvements in signal-to-noise ratio of 10 to 20 are realized over conventional circuits.

While a vibrator-type power supply has been described for the reason that it also affords a convenient source of a modulating signal, it will be understood that other regulated high voltage supplies and an auxiliary source of alternating potential for varying the voltage between the photocathode and first dynode may be used without departing from the spirit of the invention. It will also be understood that the recited values of potential are illustrative for the type of photomultiplier tube shown in the drawing for a preferred range of operation, but may be different for other types of tubes and/or applications. And while the photomultiplier has been illustrated as measuring the light output of a scintillating crystal it will, of course, be appreciated that the circuit is equally applicable where it is desired to measure any continuous light signal.

Thus, while the invention has been described as applied to a preferred embodiment, it will be understood that various omissions and substitutions may be made by those skilled in the art, without departing from the spirit of the invention. It is the intention, therefore, to be limited only as indicated by the scope of the appended claims.

What is claimed is:

1. In combination, a photomultiplier tube having a photocathode, a plurality of dynodes and a collector, means connected to said photocathode, dynodes and collector for impressing constant unidirectional operating voltages thereon, and means connected to said photocathode and that one of said dynodes which is nearest said photocathode for impressing an alternating signal thereto and arranged cyclically to vary the potential of said photocathode relative to said one of said dynodes.

2. A circuit for improving the signal-to-noise ratio of a photomultiplier having a photocathode, a plurality of dynodes, and a collector, means connected to said photocathode, dynode and collector for impressing constant unidirectional operating voltages thereon, a source of alternating voltage connected to said photocathode for cyclically preventing the attraction of electrons emitted by said photocathode toward that one of said dynodes nearest said photocathode, whereby the total signal appearing at said collector is a composite current having an alternating current component proportional to the signal and a direct current component proportional to leakage currents in said photomultiplier, and means connected to said collector for removing said direct current component.

3. In combination, a photomultiplier tube having a photocathode, a plurality of dynodes and a collector, a source of constant direct current voltage having a high voltage terminal and a low voltage terminal, a voltage divider connected at one end to the high voltage terminal of said source and to said collector and at the other end to the dynode nearest said photocathode, said voltage divider having a plurality of taps with equal resistance therebetween with such taps sequentially connected to said dynodes whereby said dynodes and collector are furnished with constant direct operating voltages, and a source of alternating potential connected to said photocathode and arranged cyclically to render the potential of said photocathode positive and negative relative to the fixed potential of said one dynode thereby cyclically preventing the attraction of electrons emitted by said cathode toward said one dynode whereby the total signal appearing at said collector is a composite current having an alternating component proportional to the signal and a direct current component proportional to leakage currents in said photomultiplier tube.

4. In a photomultiplier tube circuit, the combination comprising a source of light, a photomultiplier having a photocathode, a plurality of dynodes and a collector, said tube being disposed adjacent said source to receive light therefrom at its photocathode, a source of constant direct current potential having a high voltage terminal and a low voltage terminal, a voltage divider connected at one end to the high voltage terminal of said source and to said collector and at the other end to the first of said dynodes, said voltage divider having a plurality of taps with substantially equal resistance therebetween with such taps sequentially connected to said dynodes whereby said dynodes and collector are provided with constant direct operating voltages, a resistor connected between said photocathode and said first dynode, a source of alternating potential connected to said photocathode arranged recurrently to render the potential of said photocathode positive and negative relative to said first dynode thereby recurrently preventing the attraction of electrons emitted by said photocathode under the influence of said light source toward said first dynode, and means connected to said collector for separating the thus modulated signal current from the unmodulated leakage currents in said photomultiplier.

5. In combination, a photomultiplier having a photocathode, a plurality of dynodes and a collector, a source of constant unidirectional potential having a high voltage terminal and a low voltage terminal, a voltage divider connected at one end to the high voltage terminal of said source and at the other end to that one of said dynodes nearest said photocathode, said voltage divider having a plurality of taps with substantially equal resistance therebetween with such taps sequentially connected to said dynodes whereby said dynodes and collector are provided with constant unidirectional operating voltages, a resistor connected between said photocathode and the dynode nearest thereto, a source of alternating voltage of square waveform connected to said photocathode arranged recurrently to render the potential of said photocathode positive and negative relative to the constant potential of that dynode nearest said photocathode thereby recurrently preventing the attraction of electrons emitted by said photocathode under the influence of light incident on said photocathode toward said dynode nearest thereto, and means connected to said collector for separating the thus modulated signal current from the unmodulated leakage currents in said photomultiplier.

References Cited in the file of this patent

UNITED STATES PATENTS

| | | |
|---|---|---|
| 2,172,324 | Schubert | Sept. 5, 1939 |
| 2,407,564 | Martin et al. | Sept. 10, 1946 |
| 2,594,703 | Wouters | Apr. 29, 1952 |
| 2,615,079 | Pardue et al. | Oct. 21, 1952 |
| 2,625,653 | Wouters | Jan. 13, 1953 |
| 2,647,436 | Shapiro | Aug. 4, 1953 |